US012590637B2

(12) United States Patent
Yamaguchi et al.

(10) Patent No.: US 12,590,637 B2
(45) Date of Patent: Mar. 31, 2026

(54) SEALING DEVICE

(71) Applicant: NOK CORPORATION, Tokyo (JP)

(72) Inventors: Hiroka Yamaguchi, Fukushima (JP);
Kokichi Hamamoto, Fukushima (JP);
Hideaki Nagahamaya, Fukushima (JP);
Yuki Sato, Fukushima (JP); Kenya Yoshioka, Fukushima (JP)

(73) Assignee: NOK CORPORATION (JP)

( * ) Notice: Subject to any disclaimer, the term of this patent is extended or adjusted under 35 U.S.C. 154(b) by 0 days.

(21) Appl. No.: 18/026,286

(22) PCT Filed: Jul. 29, 2021

(86) PCT No.: PCT/JP2021/028204
§ 371 (c)(1),
(2) Date: Mar. 14, 2023

(87) PCT Pub. No.: WO2022/059360
PCT Pub. Date: Mar. 24, 2022

(65) Prior Publication Data
US 2024/0026977 A1     Jan. 25, 2024

(30) Foreign Application Priority Data

Sep. 15, 2020     (JP) ................................. 2020-154931

(51) Int. Cl.
*F16J 15/32*          (2016.01)
*F16J 15/3244*        (2016.01)
*F16J 15/3212*        (2016.01)

(52) U.S. Cl.
CPC ........ *F16J 15/3244* (2013.01); *F16J 15/3212* (2013.01)

(58) Field of Classification Search
CPC .. F16J 15/3212; F16J 15/3244; F16J 15/3252; F16J 15/3268
See application file for complete search history.

(56) References Cited

U.S. PATENT DOCUMENTS 5,002,289 A       3/1991 Yasui et al.
5,759,466 A  *    6/1998 Onuma ................ F16J 15/3244
                                            264/161
(Continued)

FOREIGN PATENT DOCUMENTS

CN          1147599 A      4/1997
JP        S55-126336 U     9/1980
(Continued)

OTHER PUBLICATIONS

International Search Report issued in PCT/JP2021/028204, mailed Sep. 21, 2021; ISA/JP (5 pages).
(Continued)

*Primary Examiner* — Christine M Mills
*Assistant Examiner* — L. Susmitha Koneru
(74) *Attorney, Agent, or Firm* — Harness, Dickey & Pierce, P.L.C.

(57)          ABSTRACT

A sealing device includes a seal lip slidably contacting an outer surface of an inside member and seals liquid in an internal space of an outside member. The seal lip has a liquid-side inclined surface, an atmosphere-side inclined surface, and a lip edge between the liquid-side and atmosphere-side inclined surfaces and extending circumferentially. Helical ribs contacting the outer surface of the inside member are on the atmosphere-side inclined surface, and incline relative to the lip edge. Each rib has a linear portion having parallel side walls and a ship-bottom-shaped portion curving to expand further than the side walls, the linear portion extends from the lip edge, and the ship-bottom-shaped portion is farther from the lip edge than the linear portion. A height of each linear portion relative to the atmosphere-side inclined surface is 5 µm to 37 µm.

7 Claims, 5 Drawing Sheets

(56)        References Cited

U.S. PATENT DOCUMENTS

|  |  |  |  |  |
|---|---|---|---|---|
| 6,036,193 | A | 3/2000 | Onuma et al. | |
| 9,133,938 | B2 * | 9/2015 | Hamamoto | F16J 15/3244 |
| 9,822,882 | B2 * | 11/2017 | Kamemura | F16J 15/3204 |
| 10,871,231 | B2 * | 12/2020 | Honma | F16J 15/3204 |
| 2005/0127613 | A1 * | 6/2005 | Furuyama | F16J 15/3244 |
| | | | | 277/529 |
| 2007/0182104 | A1 | 8/2007 | Matsui | |
| 2014/0319775 | A1 * | 10/2014 | Kamemura | F16J 15/3204 |
| | | | | 277/400 |
| 2015/0097344 | A1 * | 4/2015 | Hamamoto | F16J 15/3244 |
| | | | | 277/550 |
| 2016/0116067 | A1 * | 4/2016 | Kamemura | F16J 15/3204 |
| | | | | 277/559 |
| 2016/0252181 | A1 * | 9/2016 | Hyakutake | F16J 15/3232 |
| | | | | 277/559 |
| 2018/0003302 | A1 * | 1/2018 | Miura | F16J 15/3232 |
| 2018/0119820 | A1 * | 5/2018 | Honma | F16J 15/3204 |

FOREIGN PATENT DOCUMENTS

| JP | H01-312274 | A | 12/1989 |
|---|---|---|---|
| JP | H09-042463 | A | 2/1997 |
| JP | H10-019135 | A | 1/1998 |
| JP | H1019135 | A | 1/1998 |
| JP | H11-311338 | A | 11/1999 |
| JP | 2001173798 | A | 6/2001 |
| JP | 3278349 | B2 | 4/2002 |
| JP | 2005172061 | A | 6/2005 |
| WO | 2015053170 | A1 | 4/2015 |
| WO | 2020045070 | A1 | 3/2020 |

OTHER PUBLICATIONS

Notice of Reasons for Refusal issued in corresponding Japanese Patent Application No. 2022-550398 dated May 21, 2024, with English translation (8 Pages).

Office Action issued in corresponding Korean Patent Application No. 10-2023-7008234 dated Oct. 21, 2024, with English translation (11 Pages).

Extended European Search Report for corresponding European Patent Application No. 21869047.7 dated Sep. 5, 2024 (8 Pages).

Notice of Reasons for Refusal issued in corresponding Japanese Patent Application No. 2022-550398 dated Oct. 29, 2024, with English translation (6 Pages).

Notice of Final Rejection for corresponding Korean Patent Application No. 10-2023-7008234 dated Jun. 26, 2025, with English translation (9 Pages).

The First Office Action for corresponding Chinese Patent Application No. 202180061873.1 dated Oct. 28, 2025, with English translation (12 Pages).

European Office Action for corresponding European Patent Application No. 21869047.7 dated Dec. 15, 2025 (7 Pages).

* cited by examiner

INTERNAL SPACE

ATMOSPHERE SIDE

SEALING DEVICE

CROSS REFERENCE TO RELATED APPLICATIONS

The present application is a national phase application of International Patent Application No. PCT/JP2021/028204 filed on Jul. 29, 2021, which claims the benefit of Japanese Patent Application No. 2020-154931, filed on Sep. 15, 2020. The contents of the above applications are incorporated herein by reference in their entirety.

BACKGROUND

Technical Field

The present disclosure relates to a sealing device that is arranged between an inside member and an outside member which relatively rotate.

Related Art

A plurality of ribs in helical shapes may be formed on a surface, on an atmosphere side, of a sealing device that is arranged between an inside member and an outside member which relatively rotate. This kind of sealing device is used for performing sealing for a liquid (for example, a lubricant) which is arranged in an internal space of the outside member, and the ribs in the helical shapes cause an action (pumping action) of returning the liquid, which leaks to the atmosphere side, to the internal space in response to relative rotation between the inside member and the outside member. Consequently, leakage of much liquid to the atmosphere side is inhibited.

More specifically, the ribs in the helical shapes are inclined with respect to a lip edge of the seal lip so as to display the pumping action when the inside member rotates in one direction with respect to the outside member (for example, see Japanese Patent No. 3278349.

In a case where an inside member is rotatable in two directions with respect to an outside member, it is desirable that a sealing device can inhibit leakage of a liquid to an atmosphere side when the inside member rotates in a reverse direction to a normal rotation direction with respect to the outside member. For example, a drive shaft, a transmission shaft, or an axle of an automobile is rotatable in two directions. In particular, a rotation shaft of a drive motor in an electric automobile or a hybrid automobile rotates at a high speed.

Accordingly, the present disclosure provides a sealing device which can inhibit leakage of a liquid to an atmosphere side when an inside member rotates in a reverse direction at a high speed with respect to an outside member.

SUMMARY

A sealing device according to one aspect of the present disclosure is a sealing device being arranged between an inside member and an outside member which relatively rotate and sealing a gap between the inside member and the outside member, the sealing device including: a mounted portion mounted on the outside member; and a seal lip which is arranged in an internal portion of a hole of the outside member, slidably contacts an outer periphery surface of the inside member, partitions an internal space of the outside member off from an atmosphere side, and performs sealing for a liquid in the internal space. The seal lip has a liquid-side inclined surface arranged on an internal space side, an atmosphere-side inclined surface arranged on the atmosphere side, and a lip edge being present at a boundary between the liquid-side inclined surface and the atmosphere-side inclined surface and extending in a circumferential direction. The liquid-side inclined surface is inclined to be further spaced away from the inside member as being spaced away from the lip edge. The atmosphere-side inclined surface is inclined to be further spaced away from the inside member as being spaced away from the lip edge. A plurality of helical ribs to contact the outer periphery surface of the inside member are formed on the atmosphere-side inclined surface, and the plurality of helical ribs extend in a helical shape with inclining with respect to the lip edge. Each of the helical ribs has a linear portion having side walls being parallel with each other and a ship-bottom-shaped portion curving to be more expanded than the side walls, the linear portion extends from the lip edge, and the ship-bottom-shaped portion is arranged farther from the lip edge than the linear portion. A height of each of the linear portions with respect to the atmosphere-side inclined surface is 5 μm or more and 37 μm or less.

In this aspect, the height of the linear portion of each of the helical ribs is 5 μm or more, and each of the helical ribs thereby displays a pumping action when the inside member rotates in a forward direction with respect to the outside member. On the other hand, the height of the linear portion of each of the helical ribs is 37 μm or less, and leakage of the liquid to the atmosphere side can thereby be inhibited even when the inside member rotates in a reverse direction at a high speed with respect to the outside member.

DETAILED DESCRIPTION

Various embodiments according to the present disclosure will hereinafter be described with reference to the attached drawings. Scales of the drawings are not necessarily accurate, and a part of characteristics may be emphasized or omitted.

Figure 1:
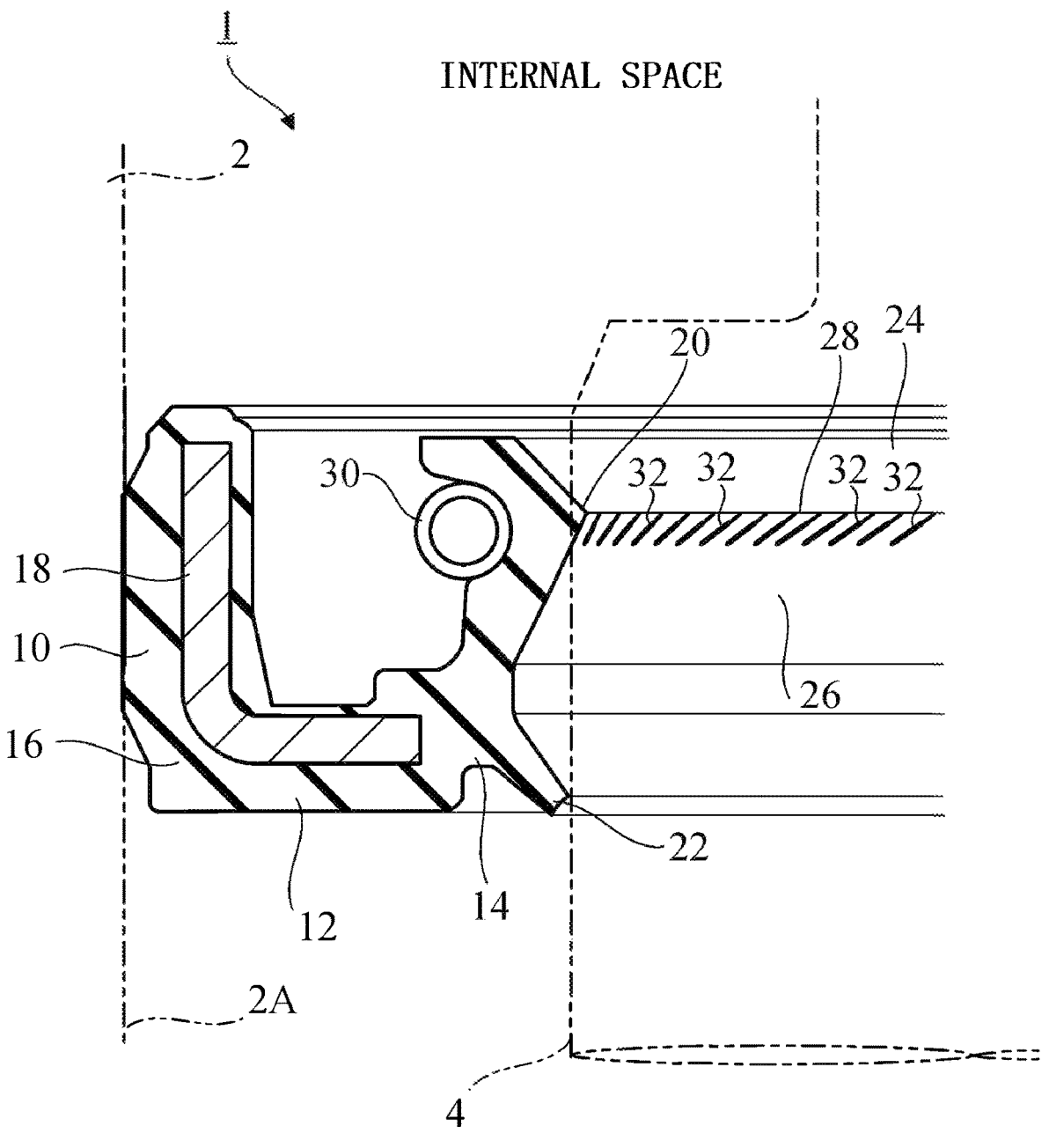
FIG. 1 is a partial cross-sectional view illustrating a sealing device according to an embodiment of the present disclosure.

As illustrated in FIG. 1, a sealing device 1 according to the embodiment of the present disclosure is arranged between a housing (outside member) 2 which is stationary and a rotation shaft (inside member) 4 and seals a gap between the housing 2 and the rotation shaft 4. A shaft hole 2A is formed in the housing 2, and the rotation shaft 4 is arranged in the shaft hole 2A. In an internal space of the housing 2, a liquid, that is, oil as a lubricant is arranged. The rotation shaft 4 has a columnar shape, the shaft hole 2A has a circular cross section, and the sealing device 1 has an annular shape, but only left halves of those are illustrated in FIG. 1.

The rotation shaft 4 is a drive shaft, a transmission shaft, or an axle of an automobile, for example.

The sealing device 1 has an outside cylinder portion 10, a coupling portion 12, and an inside cylinder portion 14. The outside cylinder portion 10 is a mounted portion which is mounted on the housing 2. In an illustrated example, the outside cylinder portion 10 is fitted into the shaft hole 2A by an interference fit procedure (that is, press-fitted). However, another mounting procedure may be used. The coupling portion 12 is arranged on an atmosphere side relative to the outside cylinder portion 10 and couples the outside cylinder portion 10 and the inside cylinder portion 14 together.

The sealing device 1 has a composite structure including an elastic ring 16 and a rigid ring 18. The elastic ring 16 is formed of an elastic material, for example, an elastomer. The rigid ring 18 is formed of a rigid material, for example, metal and reinforces the elastic ring 16. The rigid ring 18 has a cross-sectional shape in an almost L shape. The rigid ring 18 is embedded in the elastic ring 16 and is in tight contact with the elastic ring 16. Specifically, the rigid ring 18 is provided from the outside cylinder portion 10 to the coupling portion 12.

The inside cylinder portion 14 is configured with only an elastic material, and a seal lip 20 and a dust lip 22 are formed in the inside cylinder portion 14. The seal lip 20 and the dust lip 22 are arranged in an internal portion of the shaft hole 2A of the housing 2 and slidably contact an outer periphery surface of the rotation shaft 4.

The seal lip 20 partitions the internal space of the housing 2 off from the atmosphere side and performs sealing for the liquid in the internal space. That is, the seal lip 20 serves to obstruct an outflow of the lubricant.

The dust lip 22 is arranged on the atmosphere side relative to the seal lip 20 and serves to obstruct an inflow of foreign matter (including water (including muddy water or salt water) and dust) from the atmosphere side to the internal space. The dust lip 22 is an inclined plate in a circular ring shape and obliquely extends from its base portion toward the atmosphere side and an inside in a radial direction.

The seal lip 20 is a protrusion which is formed on an inner periphery surface of the inside cylinder portion 14 and has a liquid-side inclined surface 24 arranged on an internal space side, an atmosphere-side inclined surface 26 arranged on the atmosphere side, and a lip edge 28 which is present at a boundary between the liquid-side inclined surface 24 and the atmosphere-side inclined surface 26 and extends in a circumferential direction. The liquid-side inclined surface 24 has a shape of a side surface of a truncated cone and is inclined to be further spaced away from the rotation shaft 4 as being spaced away from the lip edge 28. The atmosphere-side inclined surface 26 also has a shape of a side surface of a truncated cone and is inclined to be further spaced away from the rotation shaft 4 as being spaced away from the lip edge 28.

Around an outer periphery surface of the inside cylinder portion 14, a garter spring 30 which compresses the seal lip 20 to the inside in the radial direction is wound. However, the garter spring 30 is not necessarily essential.

On the atmosphere-side inclined surface 26, a plurality of helical ribs 32 are formed. Those helical ribs 32 extend in helical shapes with inclining with respect to the lip edge 28. The helical ribs 32 are arranged at equal angular intervals from each other in the circumferential direction.

Figure 2:
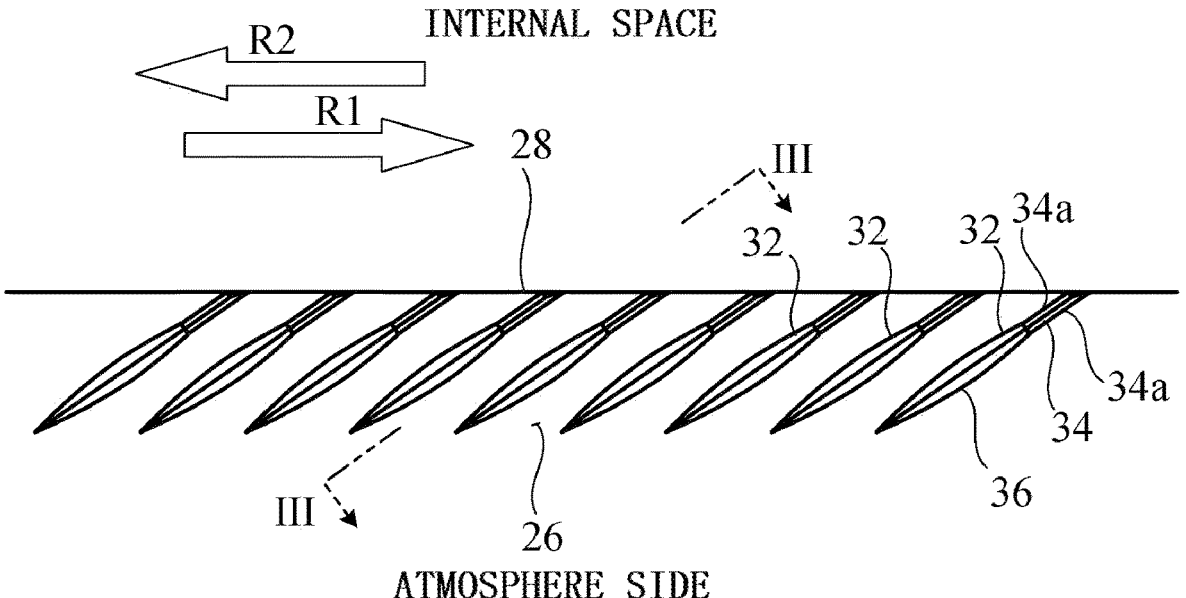
FIG. 2 is a geometry net of an inner periphery surface of a seal lip of the sealing device according to the embodiment of the present disclosure.

FIG. 2 is a geometry net of an inner periphery surface of the seal lip 20. As illustrated in FIG. 2, each of the helical ribs 32 has a linear portion 34 and a ship-bottom-shaped portion 36 which curves with expanding more than side walls 34a of the linear portion 34. The linear portion 34 is a portion which is referred to as "parallel screw protrusion" in Patent Literature 1, the linear portion 34 linearly extends and has side portions 34a being parallel with each other. The ship-bottom-shaped portion 36 is a portion which is referred to as "ship-bottom screw protrusion" in Patent Literature 1 and has a shape of a ship bottom. That is, a width of the ship-bottom-shaped portion 36 gradually becomes larger as progressing from one end along a longitudinal direction of the ship-bottom-shaped portion 36 and gradually becomes smaller as progressing from a central portion toward another end. In each of the helical ribs 32, the linear portion 34 and the ship-bottom-shaped portion 36 are arranged in series, the linear portion 34 extends from the lip edge 28, and the ship-bottom-shaped portion 36 is arranged farther (on the atmosphere side) from the lip edge 28 than the linear portion 34.

Figure 3:
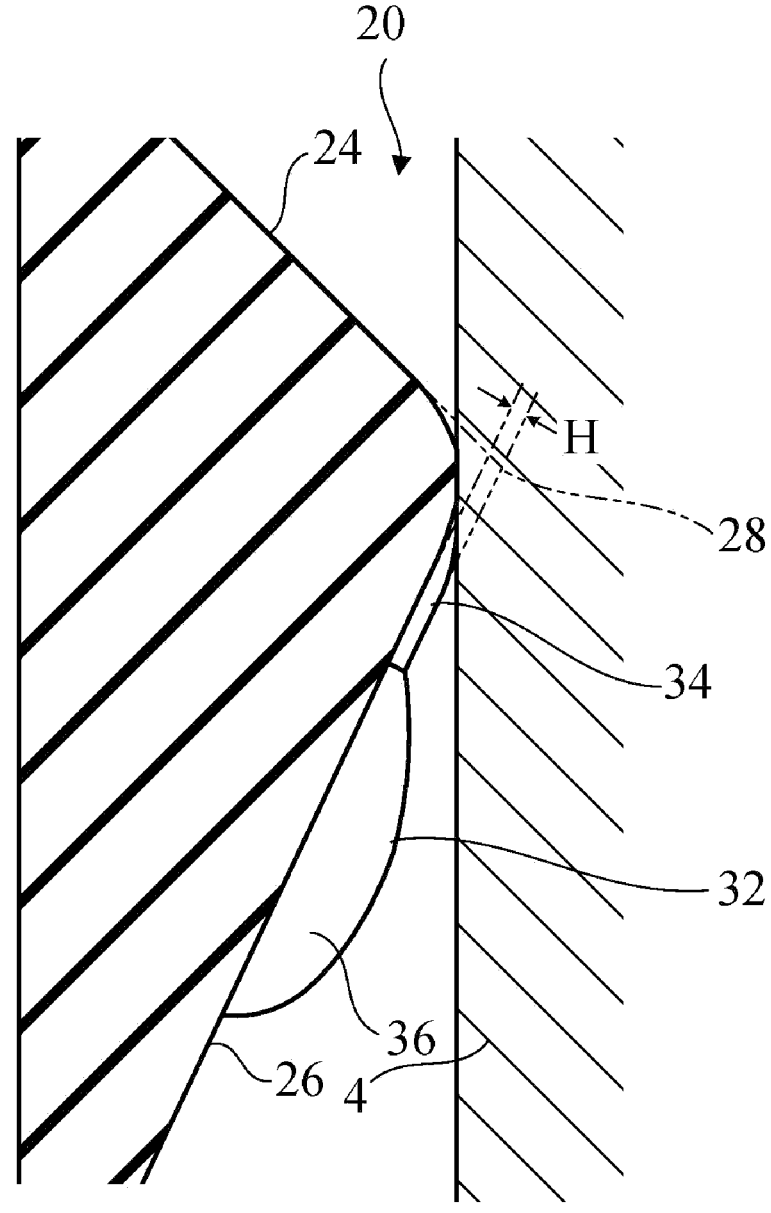
FIG. 3 is a cross-sectional view of the seal lip which corresponds to line III-III in FIG. 2.

Each of the helical ribs 32 contacts the outer periphery surface of the rotation shaft 4. FIG. 3 illustrates a state where the seal lip 20 including the helical ribs 32 contacts the outer periphery surface of the rotation shaft 4. As illustrated in FIG. 3, the lip edge 28 and the helical ribs 32 contact the outer periphery surface of the rotation shaft 4 and are elastically deformed. A deformation amount of the lip edge 28 will be referred to as interference IN.

In a state where the linear portion 34 does not elastically deform (indicated by imaginary lines), the linear portion 34, which is close to the lip edge 28, in the helical rib 32 has a uniform height H with respect to the atmosphere-side inclined surface 26 along a longitudinal direction of the helical rib 32. However, a portion of the linear portion 34, which is close to the lip edge 28, contacts the outer periphery surface of the rotation shaft 4 and is elastically deformed. Actually, although the deformation amount (interference IN) of the lip edge 28 is much larger than the height H of the linear portion 34, the height H is emphatically illustrated in FIG. 3.

On the other hand, the ship-bottom-shaped portion 36 spaced away from the lip edge 28 does not contact the outer periphery surface of the rotation shaft 4. However, when the linear portion 34 is worn away, the ship-bottom-shaped portion 36 may contact the outer periphery surface of the rotation shaft 4. The above height H of the linear portion 34 means a height of the linear portion in an initial state which arises from manufacturing of the sealing device 1.

An inclination direction of each of the helical ribs 32 is adapted to rotation of the rotation shaft 4 in a first direction R1 in FIG. 2. In other words, when the rotation shaft 4 rotates in the first direction (a forward direction, that is, a normal rotation direction of the rotation shaft 4) R1, each of the helical ribs 32 displays a pumping action and returns the liquid from the atmosphere side to the internal space.

However, when the rotation shaft 4 rotates in a second direction (reverse direction) R2 in FIG. 2, a contact state of the seal lip 20 with the rotation shaft 4 becomes unstable due to the helical ribs 32, and the liquid might leak from the internal space to the atmosphere side. It has been understood that such leakage occurs due to fine deformations of the seal lip 20 including the helical ribs 32 or to lowering of a tightening force of the seal lip 20 against the rotation shaft 4. Leakage of the liquid more easily occurs as a rotation speed of the rotation shaft 4 in the second direction R2 becomes higher. It is preferable that leakage of the liquid to the atmosphere side can be inhibited even when the rotation shaft 4 rotates in the second direction R2 at a high speed.

Accordingly, the applicant conducted an experiment for investigating performance of the helical ribs 32 by using samples of a plurality of sealing devices 1 among which the heights H of the linear portions of the helical ribs 32 were different.

In the samples used in the experiment, the heights H were 14 μm, 25 μm, 37 μm, and 48 μm. A material of the elastic ring 16 of the sample was FKM (fluoro-rubber). A diameter of the rotation shaft 4 contacting the seal lip 20 was 65 mm.

The liquid stored in the internal space was an ATF (Automatic Transmission Fluid) with a low viscosity. In the internal space, the liquid was poured to a height of a central axis line of the rotation shaft 4 (a lower portion of the rotation shaft 4 than the central axis line was immersed in the liquid).

In the experiment, the rotation shaft 4 was rotated in both of the first direction R1 and the second direction R2, and it was determined whether or not the liquid leaked to the atmosphere side. Specifically, in a case where the liquid climbed over the dust lip 22 and was able to be visually recognized, it was determined that the liquid leaked to the atmosphere side. A distance from the lip edge 28 to the dust lip 22 of the seal lip 20 was 6 mm in a no-load state.

In an experiment about rotation in the first direction R1, a circumferential speed of the rotation shaft 4 was 50 m/s. In each of the samples, the liquid did not leak to the atmosphere side.

Figure 4:
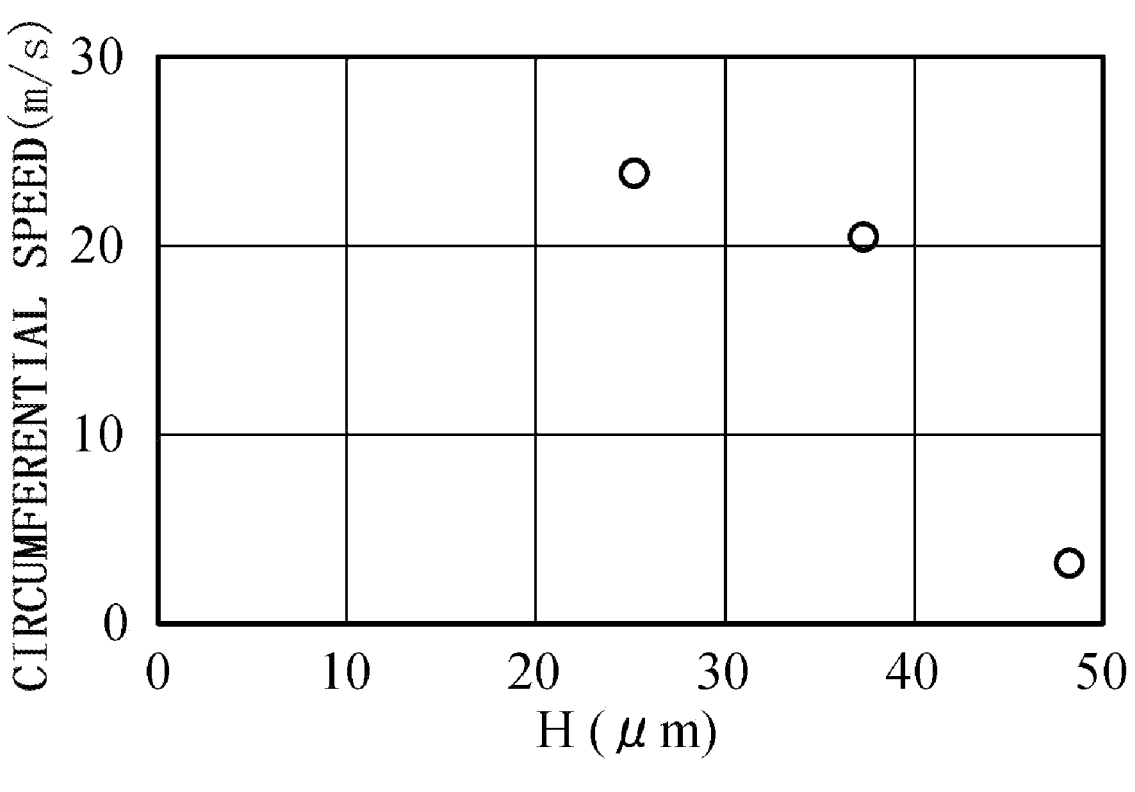
FIG. 4 is a graph representing liquid leakage prevention results of each sample of sealing devices in an experiment in which a rotation shaft is rotated in a reverse direction to a normal rotation direction.

Next, an experiment about rotation in the second direction R2 will be described. In FIG. 4, a lowest circumferential speed at which the liquid leaked to the atmosphere side in a case where the rotation shaft 4 was rotated in the second direction R2 is plotted with respect to each of the samples. In a case where the height H was 48 μm, even at a significantly low circumferential speed, the liquid leaked to the atmosphere side. On the other hand, in a case where the heights H were 25 μm and 37 μm, the liquid leaked to the atmosphere side at circumferential speeds higher than 20 m/s. This indicates that in a case where the heights H are 25 μm and 37 μm, even when the rotation shaft 4 is rotated in the second direction R2 at a circumferential speed of 20 m/s, the liquid does not leak to the atmosphere side. Because it can be considered to be clear that as the height H becomes lower, even when the rotation shaft 4 is rotated in the second direction R2 at a circumferential speed of 20 m/s, the liquid does not leak to the atmosphere side, no experiment was conducted for the sample with a height H of 14 μm.

Consequently, it is preferable that the height H of the linear portion 34 of each of the helical ribs 32 with respect to the atmosphere-side inclined surface 26 is 37 μm or less. The height H of the linear portion 34 of each of the helical ribs 32 is 37 μm or less, and leakage of the liquid to the atmosphere side can thereby be inhibited even when the rotation shaft 4 rotates in the second direction (reverse direction) R2 at a high speed with respect to the housing 2.

On the other hand, it is preferable that the height H of the linear portion 34 of each of the helical ribs 32 with respect to the atmosphere-side inclined surface 26 is 5 μm or more. The height H of the linear portion 34 of each of the helical ribs 32 is 5 μm or more, and each of the helical ribs 32 thereby displays the pumping action when the rotation shaft 4 rotates in the first direction (forward direction) R1 with respect to the housing 2.

Figure 5:
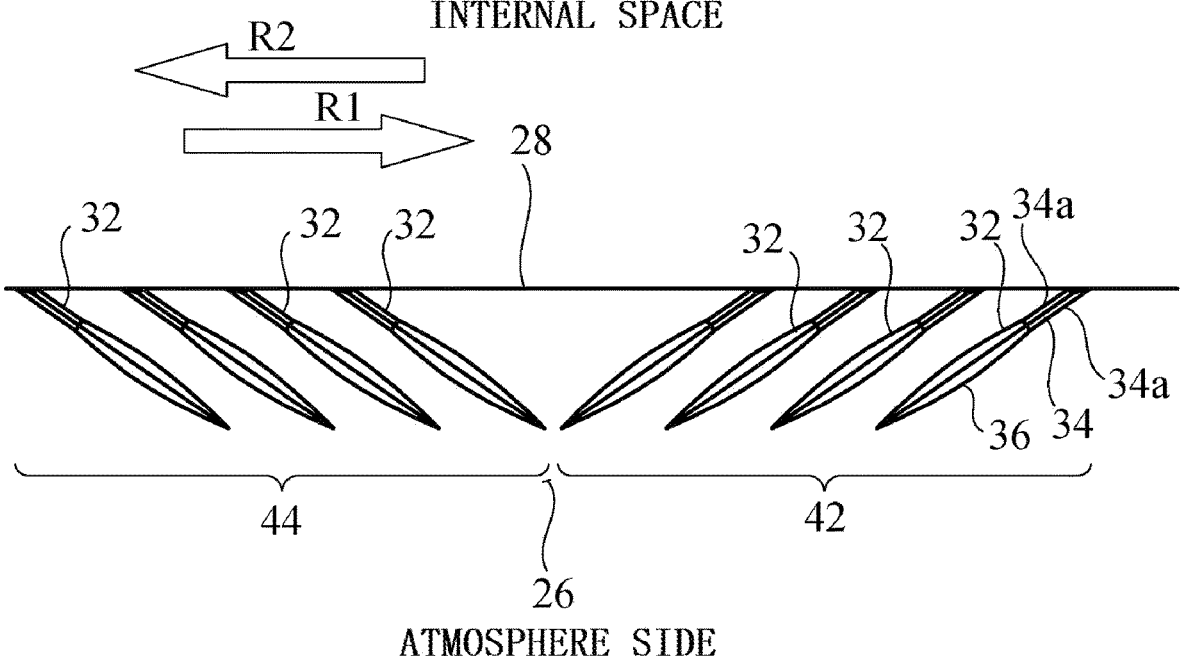
FIG. 5 is a geometry net of an inner periphery surface of a seal lip of a sealing device according to a modification of the embodiment.

FIG. 5 is a geometry net of an inner periphery surface of the seal lip 20 of a sealing device according to a modification of the embodiment. In this modification, a plurality of helical ribs 32 extending in different directions are provided. Specifically, although only a part of the inner periphery surface of the seal lip 20 is illustrated in FIG. 5, a plurality of groups 42 each of which is formed with a plurality of helical ribs 32 and a plurality of groups 44 each of which is formed with a plurality of helical ribs 32 are provided to the atmosphere-side inclined surface 26, and the groups 42 and 44 are alternately aligned in a circumferential direction.

In the group 42, an inclination direction of each of the helical ribs 32 is adapted to rotation of the rotation shaft 4 in the first direction R1. In other words, when the rotation shaft 4 rotates in the first direction R1, each of the helical ribs 32 in the group 42 displays a pumping action and returns a liquid from the atmosphere side to an internal space.

In the group 44, the inclination direction of each of the helical ribs 32 is adapted to rotation of the rotation shaft 4 in the second direction R2. In other words, when the rotation shaft 4 rotates in the second direction R2, each of the helical ribs 32 in the group 44 displays the pumping action and returns the liquid from the atmosphere side to the internal space.

As described above, in the modification in FIG. 5, even when the rotation shaft 4 rotates in either direction, the helical ribs 32 in either group display the pumping action. The present disclosure is not intended to exclude the modification in FIG. 5.

However, in the above experiment about the embodiment in which all of the helical ribs 32 have the same inclination direction, in a case where the rotation shaft 4 was rotated in the first direction R1 at a circumferential speed of 50 m/s, the liquid did not leak to the atmosphere side; however, in a case where the rotation shaft 4 was rotated in the second direction R2 at a lower circumferential speed, the liquid leaked to the atmosphere side. In other words, when the rotation shaft 4 is rotated in the second direction R2 at a circumferential speed of 50 m/s, the liquid might leak to the atmosphere side in a region corresponding to the group 42, and when the rotation shaft 4 is rotated in the first direction R1 at a circumferential speed of 50 m/s, the liquid might leak to the atmosphere side in a region corresponding to the group 44.

Consequently, to this modification, the embodiment in which all of the helical ribs 32 have the same inclination direction is preferable. In a case where the rotation shaft 4 is an axle of an automobile, for example, a rotation direction of the rotation shaft 4 is different in accordance with which of left and right the axle is arranged. In this case, it is preferable to prepare two kinds of sealing devices between which the inclination directions of the helical ribs 32 are different and to select the sealing device in accordance with the rotation direction.

In the foregoing, the present disclosure has been illustrated and described while preferable embodiments of the present disclosure are referred to, but it is to be understood that changes in forms and details are possible for a person skilled in the art without departing from the scope of the disclosure which is described in the claim. Such changes, modifications, and revisions have to be encompassed in the scope of the present disclosure.

For example, in the above embodiment, the sealing device 1 is arranged between the housing (outside member) 2 which is stationary and the rotation shaft (inside member) 4 but may be arranged between an outside member which rotates and an inside member which is stationary.

The invention claimed is:

1. A sealing device configured to be arranged between an inside member and an outside member, the inside member being configured to rotate in a first direction and a second direction opposite to the first direction relative to the outside member, and the sealing device is configured to seal a gap between the inside member and the outside member, the sealing device comprising:

a mounted portion mounted on the outside member; and a seal lip which is arranged in an internal portion of a hole of the outside member, slidably contacts an outer periphery surface of the inside member, partitions an internal space of the outside member off from an atmosphere side, and performs sealing for a liquid in the internal space, wherein, the seal lip has a liquid-side inclined surface arranged on an internal space side, an atmosphere-side inclined surface arranged on the atmosphere side, and a lip edge being present at a boundary between the liquid-side inclined surface and the atmosphere-side inclined surface and extending in a circumferential direction, the liquid-side inclined surface is inclined to be further spaced away from the inside member as being spaced away from the lip edge, the atmosphere-side inclined surface is inclined to be further spaced away from the inside member as being spaced away from the lip edge, a plurality of first groups that each include a plurality of first helical ribs that are configured to contact the outer periphery surface of the inside member are formed on the atmosphere-side inclined surface, the plurality of first helical ribs in each of the first groups extending in a helical shape inclining with respect to the lip edge such that the plurality of first helical ribs in each of the first groups are adapted for rotation in the first direction of the inside member, each of the first helical ribs has a linear portion having side walls being parallel with each other and a ship-bottom-shaped portion curving to be more expanded than the side walls, the linear portion extends from the lip edge, the ship-bottom-shaped portion is arranged farther from the lip edge than the linear portion, when the inside member is rotating in the first direction relative to the outside member, the first helical ribs are configured to pump the liquid present on the atmosphere-side back to the internal space, a height of each of the linear portions with respect to the atmosphere-side inclined surface is 5 µm or more and 37 µm or less such that when the inside member is rotating in the second direction at a speed of 20 m/s or less, the liquid is prevented from leaking to the atmosphere-side, a plurality of second groups that each include a plurality of second helical ribs, wherein each of the second helical ribs are configured to contact the outer periphery surface of the inside member and are formed on the atmosphere-side inclined surface, the plurality of the second helical ribs extend in a helical shape inclining with respect to the lip edge such that the plurality of the second helical ribs are adapted for rotation in the second direction of the inside member, each of the second helical ribs has a linear portion having side walls being parallel with each other and a ship-bottom-shaped portion curving to be more expanded than the side walls, the linear portion extends from the lip edge, the ship-bottom-shaped portion is arranged farther from the lip edge than the linear portion when the inside member is rotating in the second direction relative to the outside member, the second helical ribs are configured to pump the liquid present on the atmosphere-side back to the internal space, a height of each of the linear portions of the second helical ribs with respect to the atmosphere-side inclined surface is 5 µm or more and 37 µm or less such that when the inside member is rotating in the first direction at a speed of 20 m/s or less, the liquid is prevented from leaking to the atmosphere-side, the plurality of the second helical ribs of the plurality of second groups are inclined in the first direction of the inside member toward the atmosphere side with respect to the lip edge and the plurality of first helical ribs of the plurality of first groups are inclined in the second direction of the inside member toward the atmosphere side with respect to the lip edge such that the ship-bottom-shaped portions of the first helical ribs are inclined toward the ship-bottom-shaped portions of the second helical ribs.

2. The sealing device according to claim 1, wherein the first groups and the second groups are alternately aligned in a circumferential direction.

3. The sealing device according to claim 1, wherein the linear portion is arranged to contact the outer periphery surface of the inside member with the linear portion elastically deformed.

4. The sealing device according to claim 3, wherein the ship-bottom-shaped portion is arranged not to contact the outer periphery surface of the inside member.

5. The sealing device according to claim 1, wherein, in each of the first helical ribs and the second helical ribs, the linear portion and the ship-bottom-shaped portion are arranged in series.

6. The sealing device according to claim 1, wherein, a width of the ship-bottom-shaped portion gradually becomes larger as progressing from one end along a longitudinal direction of the ship-bottom-shaped portion and gradually becomes smaller as progressing from a central portion toward another end.

7. The sealing device according to claim 1, wherein the height of each of the linear portions with respect to the atmosphere-side inclined surface is 5 µm or more and 25 µm or less.

* * * * *